United States Patent Office 2,760,974
Patented Aug. 28, 1956

2,760,974

SEPARATION OF PHOSPHORYL AMIDE ADDUCTS OF BENZENE DICARBOXYLIC ACIDS

Art C. McKinnis, Long Beach, Calif., assignor to Union Oil Company of California, Los Angeles, Calif., a corporation of California Application July 28, 1952, Serial No. 301,304

12 Claims. (Cl. 260—501)

This invention relates to a new class of chemical compounds which may be designated as adducts of hydrocarbon substituted phosphoryl amides, and to new uses for such compounds. More particularly the adducts are compounds formed by hydrogen bonding between a hydrocarbon substituted phosphoryl amide, which may be termed the hydrogen bonding agent, and another organic component which may be termed the hydrogen donor. These compounds in general are useful for a wide variety of purposes, for example as insecticides, plasticizers, germicides, chemical intermediates, solvents. They may also be utilized to aid in separating and identifying organic compounds containing one or more groups capable of forming a hydrogen bond with an electronegative atom such as oxygen or nitrogen.

Figure 1:
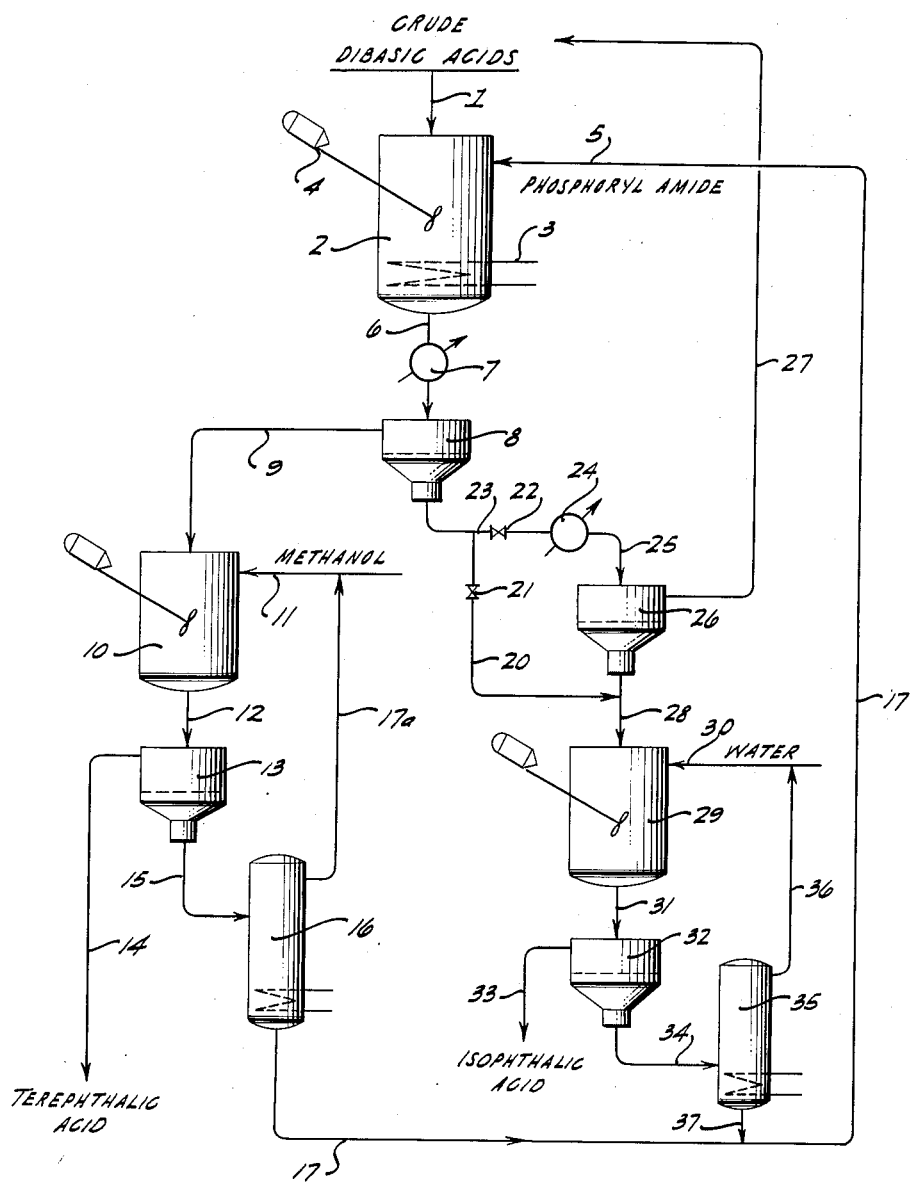

An object of this invention is to provide a new class of chemical compounds, and to utilize such compounds for effecting separation of various difficulty separable mixtures. Other objects will appear from the following detailed description:

In the drawings Fig. 1 represents a flow sheet of a process for separating isophthalic and terephthalic acids, utilizing the herein described adducts to facilitate the separation.

Figure 2:
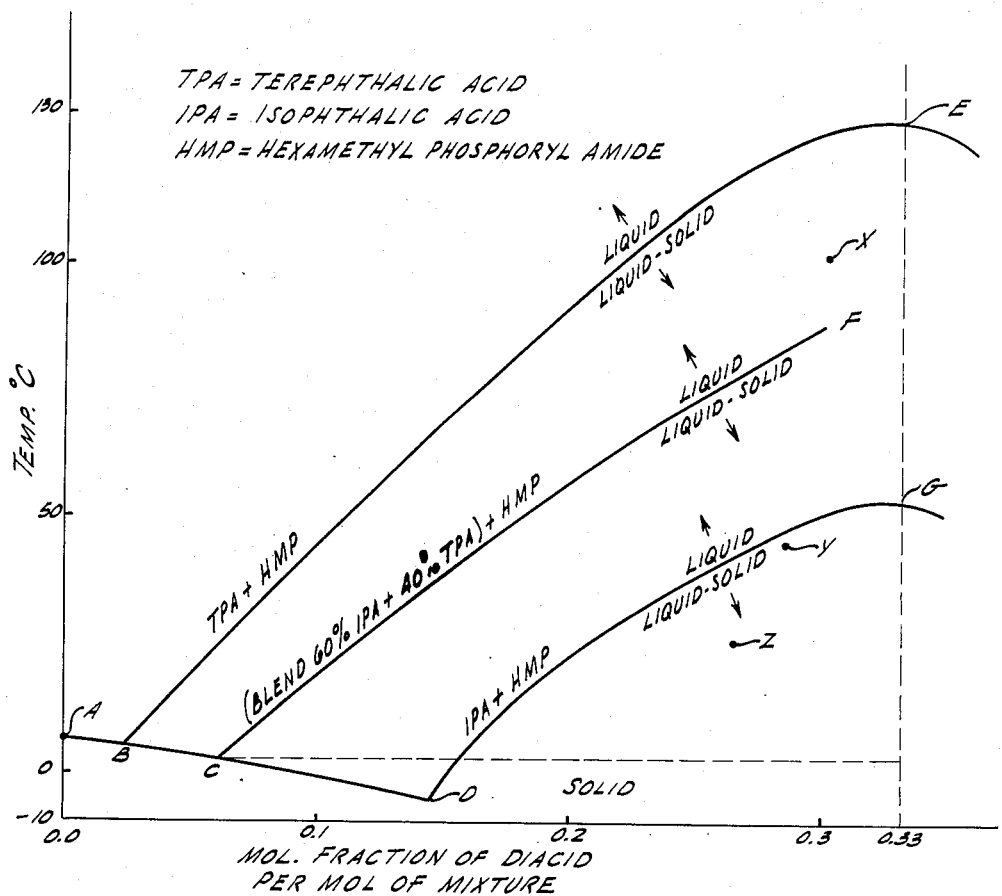

Fig. 2 shows the temperature-solubility relationship of isophthalic and terephthalic acid adducts and mixtures thereof in hexamethyl phosphoryl amide. The significance and specific explanation of these figures will be described hereinafter.

Compounds formed by hydrogen bonding are in general well recognized in the chemical literature. Such compounds are discussed, for example in "The Nature of the Chemical Bond" by Linus Pauling, Cornell University Press, 1940, pages 284 to 334. The known types of hydrogen bonding may be divided roughly into two classes: inter-molecular and intra-molecular. Alcohols exemplify those compounds which show a strong tendency toward inter-molecular hydrogen bonding to form loosely bonded polymers, as shown by the following formula:

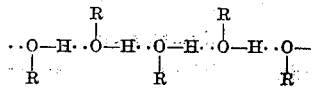

Dicarboxylic acids such as terephthalic acid are also capable of forming long polymeric molecules by inter-molecular hydrogen bonding, resulting in abnormally high melting and boiling points. Ortho-nitro-phenol, however, is a prime example of a compound which forms strong intra-molecular hydrogen bonds as shown by the following formula:

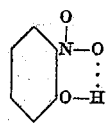

It is in general characteristic of the polymers formed by intermolecular hydrogen bonding that discreet polymers having a given molecular weight cannot be isolated in pure form due to the weak nature of the hydrogen bond, and the resulting formation of mixtures of highly polymerized and less polymerized molecules in equilibrium with molecules wherein no hydrogen bonding is present.

The present invention is based upon the discovery that the hydrogen bonding agents consisting of the substituted phosphoryl amides are capable of forming stronger hydrogen bonds with all known types of hydrogen donors than has been known in the past. These particular hydrogen bonding agents may be designated by the following general formula:

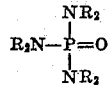

wherein each R represents the same or different alkyl, aryl or cycloalkyl groups. The alkyl amido groups attached to the phosphorus atom exhibit an exceptionally strong electron donating tendency which renders the phosphorus atom highly negative. The highly negative phosphorus atom in turn repels electrons toward the oxygen atom, with the result that the oxygen atom is highly negative, and has an exceptionally strong tendency to form hydrogen bonds with hydrogen donors.

The compounds formed between these hydrogen bonding agents and the hydrogen donors may be designated by the following general formula:

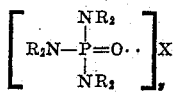

wherein X represents the hydrogen-donor compound containing y hydrogen bond-forming groups, and y is one or more. The hydrogen bond-forming groups in X are selected from the class consisting of hydroxyl (HO—), carboxyl (HOOC—), amine (H$_2$N—), hydrogen polychlorocarbon groups, (HCCl$_2$R;HCCl$_3$), and acetylenic groups (HC≡C—. The adducts may be formed in general by simply mixing the phosphoryl amide with the required molar proportion of the hydrogen donor compound, and they may be purified by washing or recrystallization from relatively non-polar solvents such as acetone, benzene, toluene, xylene, etc.

A preferred class of hydrogen bonding agents consists of the hexa-alkyl phosphoryl amides, and particularly the lower alkyl amines, i. e. those wherein the alkyl groups contain from 1 to 8 carbon atoms. Some of these compounds are new in themselves and a general method for their preparation will hence be described. According to one possible method they may be obtained by reaction between a phosphorus oxyhalide, e. g. phosphorus oxychloride or phosphorus oxybromide, with a dialkylamine, e. g. dimethylamine, diethylamine, methylethylamine, etc. The reaction occurs readily in the absence of catalysts and at ordinary or only moderately elevated temperatures. An excess of the dialkylamine reactant is usually employed to promote the formation of a maximum quantity of the tri-substituted halogen-free compound, and also to fix in the form of a dialkylamine hydro-halide salt the hydrogen halide which is evolved from the reaction. If desired, a reaction solvent such as benzene, toluene, acetone, etc. may be employed. The reaction is conveniently carried out simply by gradually adding the dialkylamine reactant to the phosphorus oxyhalide while allowing the heat of reaction to provide a moderate increase in temperature. Upon completion of the addition of the dialkylamine reactant, the temperature is usually increased to about 100°–200° C. for a short period of time to insure completion of the reaction, after which the crude reaction product may be fractionally distilled to recover first any excess free dialkylamine, and then the hexa-alkyl phosphoryl amide product in substantially pure form. A quantity of dialkylamine equal to that which has reacted with the phosphorus oxyhalide is obtained as distillation bottoms in the form of a hydro-halide salt, and if desired, may be recovered by adding an aqueous alkali and distilling.

The following example will illustrate the preparation of one of the hexa-alkyl phosphoryl amides of the present class, but is not to be construed as limiting the invention.

Example I

Gaseous dimethylamine is passed into 154 parts by weight of phosphorus oxychloride at a rate of about 45 liters/hr. over a period of about 3 hours, after which time no further quantity of the amine is absorbed by the phosphorus oxychloride. Approximately 275 parts by weight of the amine are consumed in this manner. During the addition of the amine reactant the temperature of the reaction mixture rises from about 20° C. to about 170° C., over a period of about 2 hours after which the reaction temperature is maintained at about 160° C. by immersing the reaction vessel in an oil bath. Upon completion of the reaction the crude reaction product is transferred to a distillation column and is fractionally distilled under vacuum. The hexamethyl phosphoryl amide product is obtained as a water-white mobile liquid distilling at about 69°–71° C. under 1 mm. pressure. It has a specific gravity of about 1.03 at 20° C., and a viscosity of 3.4 cps. at 25° C. Other hexa-alkyl phosphoryl amides of the present class may be prepared employing analogous procedures. Those skilled in the art will readily understand also that the aryl- or cycloalkyl phosphoryl amides may also be prepared by substituting the appropriate diarylamine or dinaphthenyl amine for the dimethylamine in the above example. Any other suitable method may be employed for preparing any of the above compounds.

The hydrogen donors which may be combined with the phosphoryl amides by hydrogen bonding include in general any organic compound containing one or more groups which are capable of donating a proton to form a hydrogen bond. Such compounds include aliphatic and naphthenic alcohols, aliphatic, naphthenic and aromatic amines, phenols, aliphatic, naphthenic and aromatic carboxylic acids, acetylenic compounds, and compounds containing a hydrogen atom bonded to a carbon atom to which is bonded at least two chlorine atoms. Specific examples of such compounds include methanol, ethanol, propanol, isopropanol, butanol, cyclohexanol and the higher alcohols; ethylene glycols, propylene glycol, glycerol, diethylene glycol and polyalkylene glycols in general; hydroquinone, resorcinol, catechol, phenol, o-, m- and p-cersol, theymol, alpha- and beta-naphthol, pyrogallol, guaiacol, phloroglucinol, salicylaldehyde, methyl salicylate, terephathalic acid, isophthalic acid, phthalic acid, salicylic acid, benzoic acid, acetic acid, lauric acid, adipic acid, lactic acid, citric acid, acrylic acid, glycine, hexahydrobenzoic acid, o-, m-, and p-toluic acids, nicotinic acid, isonicotinic acid, para-amino-benzoic acid, aniline, benzidine, cyclohexylamine, ethylene diamine, hexamethylene diamine, o-, m- and p-toluidine, chloroform, pentachloroethane, phenyl acetylene.

As has been previously indicated, the adducts of this invention may be prepared by simply admixing the phosphoryl amide with the desired molar proportion of the hydrogen donor. The reaction may be conducted preferably at room temperature, but lower or higher temperatures may also be employed. If the hydrogen donor employed is one which in itself forms strong intermolecular hydrogen bonds, for example terephthalic acid or isonicotinic acid, the resulting adduct with the phosphoryl amide will exhibit a considerably lower melting point than the original hydrogen donor. The adduct formed with non-polymeric hydrogen donors may not exhibit a lowered melting point. Any of the adducts formed herein may be purified by such conventional methods as distilling off excess phosphoryl amide or hydrogen donor, or by washing or recrystallization with non-polar solvents. The adducts are found to exhibit distinct and sharp melting points, and generally assume definite crystalline forms. Frequently, the adducts exhibits greatly increased solubilities in the various non-polar solvents as compared to the parent hydrogen donor. In cases wherein the hydrogen donor and/or the phosphoryl amide are solids at ordinary temperatures, the adduct formation may be conducted in a non-polar solvent phase such as in benzene or acetone. It is found that in all cases the oxygen atom of the phosphoryl amide is so strongly electro-negative that any hydrogen bonding originally present in the hydrogen donor is disrupted in favor of hydrogen bonding with the phosphoryl amide. Therefore the adducts obtained are found to contain one mol of phosphoryl amide for each mol of hydrogen-donating group. This definite combining ratio indicates the strength of the hydrogen bond or bonds which are formed.

The following examples will illustrate the preparation of several representative adducts of the present class. These examples should not, however be construed as limiting the invention:

Example II

About 358 grams of hexamethyl phosphoryl amide is heated to about 150° C. and 166 grams of terephthalic acid is added with stirring and continued heating. The temperature is maintained at about 150° C. for a few minutes and the mixture is then allowed to cool whereupon a solid mass of crystals is formed. The crystals are dissolved in about 300 ml. of boiling acetone. Upon cooling a second crop of crystals is formed which is recovered by filtration. The recrystallized adduct is then washed with cold acetone and dried in a current of air. Large, colorless crystals are obtained melting at 128° C. Analysis indicates a product corresponding to the formula:

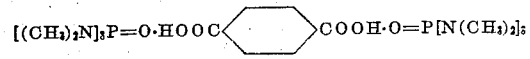

Example III

By substituting isophthalic acid for the terephthalic acid of Example II, and carrying out the adduct-forming reaction at 50° C., a similar appearing crystalline adduct is obtained melting at 52° C. and corresponding to the formula:

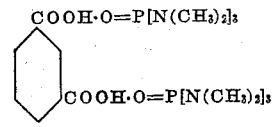

Example IV

By substituting phthalic acid for the terephthalic acid of Example I, and carrying out the adduct-forming reaction at 80° C., a similar appearing crystalline adduct is obtained melting at 70° C. and corresponding to the formula:

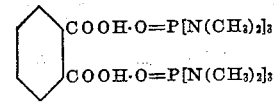

Example V

About 110 grams of hydroquinone is dissolved in 300 ml. of benzene, and 358 grams of hexamethyl phosphoryl amide is added slowly with stirring at room temperature. A slight warming of the mixture is noted.

About half of the benzene is removed by distillation and the mixture is cooled whereupon a crystalline phase is formed. The crystals are removed by filtration and washed with a small amount of cold benzene. Upon drying at 100° C. in a stream of air, large, colorless crystals are obtained melting at 152° C., and corresponding to the formula:

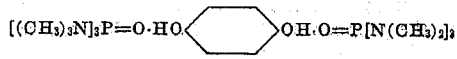

Example VI

About 62 grams of ethylene glycol is mixed at room temperature with 358 grams of hexamethyl phosphoryl amide. Upon cooling the mixture, a mass of colorless crystals is obtained which melt at —20° C. and correspond to the formula:

Example VII

About 122 grams of benzoic acid is dissolved slowly at room temperature in 179 grams of hexamethyl phosphoryl amide. Upon cooling the mixture a mass of colorless crystals is obtained melting at 10° C., and corresponding to the formula:

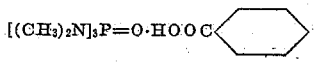

Example VIII

By substituting an equivalent amount of benzidine for the terephthalic acid of Example I a colorless crystalline adduct of benzidine and hexamethyl phosphoryl amide is obtained melting at 132° C.

Example IX

By substituting an equivalent amount of aniline for the benzoic acid of Example VII a colorless, crystalline adduct of aniline and hexamethyl phosphoryl amide is obtained melting below 0° C.

By substituting other alkyl, aryl or cycloalkyl phosphoryl amides for the hexamethyl phosphoryl amide employed in the above examples, analogous compounds are obtained showing in general the expected gradations in physical properties with increasing molecular weight. Also, any of the above described hydrogen-donating compounds may be substituted in molar-equivalent quantities for the particular acids, phenols, alcohols and amines disclosed in the examples.

A preferred class of adducts consists of those formed between the lower alkyl phosphoryl amides and aromatic hydroxyl-containing hydrogen donors. The term "hydroxyl-containing hydrogen donors" is intended to include primarily aromatic carboxylic acids and phenols. These materials form particularly strong hydrogen bonds with the phosphoryl amides, and are hence exceptionally stable. They are useful in a wide variety of applications. The phenolic adducts form useful germicides and antiseptics. All are useful intermediates for preparing functional derivatives of the hydrogen-donor such as esters, ethers, etc., and for separating difficulty separable mixtures of organic compounds.

Many mixtures of difficulty separable organic compounds may be readily separated by utilizing the ability of one or more of the components thereof to form adducts as herein described, and subsequently employing chemical or physical methods for separating the adducts from each other, or the adducts from the nonadducts. One type of mixture which may be so separated consists of mixtures of chemically dissimilar compounds which differ in their ability to form the herein described adducts. As an example of such a mixture may be cited the gaseous mixtures obtained by the pyrolysis or partial oxidation of hydrocarbons at high temperatures, and containing acetylene, carbon monoxide, carbon dioxide, hydrogen, nitrogen, ethylene and other hydrocarbons. In this case the separation is obtained by scrubbing the gaseous mixture with any of the phosphoryl amides herein disclosed, whereupon the acetylene selectively forms an adduct with the phosphoryl amide which is soluble therein, and the other components of the mixture fail to form such adducts. The dissolved acetylene adduct may then be decomposed as by heating, and the liberated acetylene recovered.

Another type of mixture which may be resolved consists of chemically and physically similar compounds such as isomeric carboxylic acids or phenols. The components of these mixtures may exhibit approximately equal capacities for forming the herein described adducts, but the adducts may be separated by various methods. For example, mixtures consisting essentially of terephthalic and isophthalic acids obtained by the oxidation of isomeric xylene mixtures may be separated by first forming the phosphoryl amide adducts of the components, and then separating the adducts by fractional crystallization or by solvent extraction, or both. Fractional crystallization and solvent extraction are not economically effective for separating the acids themselves since they sublime before melting and are at most only slightly soluble in known solvents e. g. acetone, alcohol, ether, benzene. However, the terephthalic acid adducts described herein melt at considerably higher temperatures than the corresponding isophthalic adducts (cf. Examples I and II), and the two may hence be readily separated by fractional crystallization.

Moreover, the isophthalic acid adducts are more soluble in an excess of the phosphoryl amide at any given temperature than the corresponding terephthalic acid adducts. An effective separation of the adducts may hence be achieved by solvent extraction of the solid acid mixture with excess phosphoryl amide adduct-former, or by fractional crystallization from a solution of the mixed adducts in the phosphoryl amide. In the former case, the isophthalic acid adduct is selectively dissolved leaving a solid residue enriched in terephthalic acid adduct; in the latter case the terephthalic acid adduct is preferentially precipitated from solution by chilling or vacuum concentration of a solution of the mixed acid adducts. In either case the recovered terephthalic acid adduct may be decomposed with a stronger hydrogen donor such as water or methanol to yield the pure acid and a water or methanol adduct of the phosphoryl amide. The phosphoryl amide may then be regenerated by heating to drive off the water or methanol. Similarly, water may be added to the residual phosphoryl amide solution of isophthalic acid adduct, thereby precipitating isophthalic acid which may then be recovered by filtration.

The above methods for recovering the acids from their adducts by adding a stronger hydrogen donor may be characterized generally as adduct-metathesis, as shown by the following general equation:

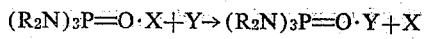

This general reaction may be utilized to separate the adduct mixtures in cases where Y in the above equation is intermediate in strength as a hydrogen donor between, for example, X and $X_1$ components of a mixture to be separated. This condition exists for example in the case of isophthalic-terephthalic adduct mixtures. The isophthalic acid may be displaced from its adducts by water, but not by methanol, while terephthalic acid is displaced by either water or methanol. This adduct mixture may hence be treated with methanol to precipitate predominantly terephthalic acid, and then with water to precipitate isophthalic acid. Substantially any mixture of adducts containing X and $X_1$ as hydrogen donors may be resolved by proper selection of other hydrogen donors Y of intermediate hydrogen-donating tendencies between X and $X_1$. Y may for example be any of the hydrogen donor compounds heretofore listed.

In a manner analogous to the above described procedures, other isomeric mixtures, or mixtures of chemically similar compounds may be resolved into their components. Examples of such mixtures include nicotinic and isonicotinic acids, alpha- and beta- naphthol, meta- and paracresol, vinylacetylene and butadiene, phenyl-acetylene and styrene, ortho, and meta-toluic acids, ortho-, meta- and para-toluidine, etc.

From the above it will be seen that the herein described adducts form a convenient means for separating many difficulty separable mixtures of organic compounds. In order to further illustrated the invention the following examples are cited of typical separation techniques which may be employed.

Typical separation techniques may be illustrated by the separation of mixtures of chemically and physically similar compounds such as terephthalic and isophthalic acids. Such mixtures, containing varying proportions of the two acids, may result from the oxidation of mixtures of the isomeric xylenes. In view of the present demand for pure terephthalic acid for use in manufacturing various synthetic resins and fibers, an economical method for obtaining the substantially pure acids from mixtures thereof is highly desirable, since as previously indicated, conventional methods for separating the acids are economically unsatisfactory. Previous methods have in fact been so unsatisfactory that they are generally avoided by first effecting a separation of the xylene isomers by fractional crystallization or other methods, and then oxidizing the pure p-xylene to terephthalic acid, or the pure m-xylene to isophthalic acid. The xylene isomer separation is also a difficult and expensive one. The present process avoids the xylene separation problem, and provides an efficient and inexpensive method for separation of the dibasic acid mixture.

Referring more particularly to Fig. 2, this graph shows the temperature-solubility curves for terephthalic and isophthalic acid adducts of hexamethyl phosphoryl amide and mixtures thereof in excess phosphoryl amide. In this graph the point A represents the melting point of pure hexamethyl phosphoryl amide (HMP): the point B represents the eutectic point of HMP plus terephthalic acid adduct; C represents the eutectic point of HMP plus a blend of 60% isophthalic and 40% terephthalic acid adducts; D represents the eutectic point of HMP plus isophthalic acid adduct; E represents the melting point of the adduct, terephthalic acid·2HMP; G represents the melting point of the adduct, isophthalic acid·2HMP; the line BE represents the temperature-solubility curve of terephthalic acid adduct in HMP; the line CF represents the temperature-solubility curve of a blend of 60% isophthalic and 40% terephthalic acid adducts in HMP; DG represents the temperature-solubility curve of isophthalic acid adduct in HMP. At any point to the left of line EG, sufficient HMP is present to provide an excess over that stoichiometrically required for formation of the adducts, dibasic acid·2HMP. At any point above the respective curves BE, CF and DG, mixtures containing the respective indicated ratios of terephthalic to isophthalic acid will exist as a single liquid phase; below those curves, but above the respective eutectic points B, C, & D, the mixtures will form a two-phase, liquid-solid system. Obviously, curves corresponding to other ratios of terephthalic to isophthalic acids may be interpolated in the graph with approximate accuracy.

From the data presented it is obvious that the isophthalic acid adduct is considerably more soluble in HMP than the terephthalic acid adduct. The terephthalic adduct may therefore be fractionally crystallized from HMP solutions containing a mixture of the adducts by simply chilling or evaporating such solutions to a point below their respective solubility curves. For example, a mixture consisting of 60% isophthalic acid and 40% terephthalic acid may be dissolved in HMP at 100° C. to form a solution indicated by X on the graph. Upon cooling this solution to about 85° C., solid terephthalic acid adduct of HMP begins to precipitate. Upon further cooling, more solid material precipitates. If the cooling is conducted slowly so that near-equilibrium conditions prevail, substantially no isophthalic acid adduct will precipitate until a point is reached below the curve DG, for example at the point Y. Upon cooling below point Y, the proportion of isophthalic adduct crystallizing out may increase rapidly. At a point represented by Z, the remaining mother liquor will be substantially free from terephthalic acid, and the precipitate which formed between Y and Z may contain substantial proportions, sometimes almost equal proportions, of isophthalic and terephthalic acid adducts. This mixtures may advantageously be recrystallized from frsh HMP, with or without fresh feed mixture. The terephthalic acid adduct which separates between X and Y is preferably decomposed with methanol to yield pure solid terephthalic acid and a methanol liquor containing HMP and small amounts of isophthalic acid adduct in solution. The final mother liquor obtained at Z contains the bulk of the isophthalic acid adduct which is preferably decomposed with water to precipitate isophthalic acid and leave an aqueous liquor containing HMP.

The separation of isophthalic and terephthalic acid mixtures may be carried out by the procedure specifically illustrated in Fig. 1. According to this procedure the crude mixture of dibasic acids, containing any desired ratio of isophthalic to terephthalic acid, is introduced through line 1 into a vessel 2 equipped with a steam heating coil 3, or other suitable heating device, and a stirring device 4. The desired phosphoryl amide is introduced through line 5. It is preferable to employ at least about two molar proportions of phosphoryl amide per mole of dibasic acids. This minimum relative proportion provides just sufficient phosphoryl amide to combine stoichiometrically, forming a mixture of the pure adducts. In this case the subsequent fractional crystallization leaves a mother liquor containing the same molar proportion of phosphoryl amide to dibasic acid as the solid crystalline phase. However, it is preferable to employ an excess of the phosphoryl amide, above the stoichiometric ratio, in order to obtain greater purity of the product which crystallizes out. It is found that optimum results are obtained when the original mole ratio of diacids to phosphoryl amide is between about 1/10 and 1/2. The crystallization of terephthalic acid will then result in an increase in the ratio of phosphoryl amide to dibasic acid in the mother liquor.

The mixture of phosphoryl amide and di-acids is heated and agitated in vessel 2 until the solid is all dissolved. The resulting fluid mixture is withdrawn through line 6 and passed through the cooler 7 in order to cool the mixture down to a point below its temperature-solubility curve. In the case of HMP, this point may be determined approximately by interpolation in the graph of Fig. 2. It is preferable to cool the liquid mixture to within about 10° C. above or below the temperature solubility curve for isophthalic acid plus phosphoryl amide. The cooling should preferably be conducted over a period of time such as about 1/2 hour in order to maintain equilibrium conditions, favoring the precipitation of pure terephthalic acid adduct. If the first crystallization is conducted carefully at slightly above the temperature-solubility curve for isophthalic acid plus phosphoryl amide, the precipitated phase will consist of almost pure terephthalic acid adduct. It is preferable to crystallize only part of the terephthalic acid in this first stage in order to obtain maximum purity.

The slurry from cooler 7 is then transferred to a filter 8 and the precipitate is recovered and transferred through line 9 to a treating vessel 10. In treating vessel 10 the terephthalic acid adduct, containing occluded mother liquor, is treated with sufficient methanol, introduced through line 11, to decompose the terephthalic acid adduct and dissolve the occluded phosphoryl amide and isophthalic acid adduct. The reaction slurry from vessel 10 is then transferred through line 12 to a filter 13. The filter cake from filter 13 consists of substantially pure terephthalic acid which may be washed with methanol or other solvent to remove traces of phosphoryl amide and other impurities. The purified terephthalic acid is withdrawn through line 14.

The filtrate from filter 13 is withdrawn through line 15 and transferred to a boiler or distillation column 16 where the methanol is distilled overhead and recycled through line 17a to line 11. The still bottoms from distillation column 16 consist of the phosphoryl amide together with small amounts of isophthalic acid adduct and terephthalic acid adduct. This mixture is preferably recycled through line 17 to reaction vessel 2 for further purification.

The filtrate from filter 8 will ordinarily still contain appreciable quantities of terephthalic acid adduct, especially if the reaction mixture from vessel 2 was cooled to only slightly below its temperature-solubility curve. It is therefore preferable to close valve 21 and open valve 22 whereby the filtrate passes through line 23 into a second heat exchanger or cooler 24 where the mixture is further cooled, preferably to somewhat below the isophthalic acid-phosphoryl amide temperature-solubility curve. It is generally preferred to cool the mixture in this step to between about zero and 10° C. below the isophthalic acid-phosphoryl amide temperature-solubility curve. This may result in the crystallization of a mixture containing substantial proportions of both the terephthalic and isophthalic acid adducts. The resulting slurry is then transferred through line 25 to a filter 26. The precipitated mixed di-acids are then preferably recycled through line 27 to be mixed with the feed mixture entering line 1. The filtrate is removed through line 28.

In those cases wherein the first cooling in heat exchanger 7 was carried to such a degree as to precipitate practically all of the terephthalic acid, it may be desirable to bypass filter 26 by closing valve 22 and opening valve 21, whereby the filtrate from filter 8 flows directly through line 20 into line 28. In any event the filtrate passing into line 28 consists of, or comprises predominantly, the isophthalic acid adduct of the phosphoryl amide plus any excess phosphoryl amide. This filtrate is then admitted to water decomposition vessel 29, to which water is added through line 30 to displace the isophthalic acid from its adduct. This requires sufficient water to combine with all the phosphoryl amide, i. e. at least ½ mole of water per mole of phosphoryl amide. By agitating the mixture in vessel 29 for a short period of time, e. g. ½ hour, a solid-liquid slurry is formed. This slurry is removed through line 31 and filtered in filter 32. The precipitate may be washed with methanol or other solvent and is then found to consist of isophthalic acid of the desired purity. Obviously, if the purity is insufficient for the desired purposes the mixture may be subjected to additional adduct formation stages with subsequent fractional recrystallization. In this manner isophthalic acid of any desired purity may be obtained. The filtrate from filter 32 is removed through line 34 and transferred to a boiler 35 where the combined and excess water is driven off through line 36. The regenerated phosphoryl amide is removed through line 37 and passed into line 17 for recycling to reaction vessel 2.

The following examples are illustrative of specific procedures employing the general separation technique illustrated in Fig. 1.

*Example X*

A mixture consisting of 1 mole of isophthalic acid and 2 moles of terephthalic acid is dissolved in about 8 moles of hexamethyl phosphoryl amide with heating and agitation to maintain the temperature at about 110° C. The solution is then cooled slowly with agitation to about 15° C. The crystals are removed by filtration and agitated with about twice their weight of methanol to displace terephthalic acid from its HMP adduct and dissolve the isophthalic acid adduct. The reaction mixture is then filtered to recover solid terephthalic acid of about 99% purity and 85% yield. The filtrate is distilled to drive off methanol, and the distillation residue, containing HMP and small amounts of the dibasic acid adducts, may be again used for adduct formation. The filtrate from the first filtration is then mixed with about 10 moles of water whereupon isophthalic acid is precipitated. The isophthalic acid, as recovered by filtration and washing, is about 87% pure.

This example shows the relative purity of products which may be obtained by a single fractional crystallization combined with a selective decomposition of adduct with methanol. By suitable recycling of recovered HMP containing small amounts of dibasic acids, loss of dibasic acid is prevented and the yields obtained approach theoretical.

*Example XI*

A mixture consisting of 1 mole of terephthalic acid and 2 moles of isophthalic acid is dissolved in about 10 moles of hexamethyl phosphoryl amide with heating and agitation to maintain a temperature of about 85° C. The solution is then cooled slowly to a temperature of about 27° C. The cooled solution is then filtered to yield a filtrate A and a crystalline terephthalic acid-adduct filter cake. The crystals are agitated with about twice their weight of methanol and the resulting slurry is then filtered to recover solid terephthalic acid of 99% purity and about 75% yield, and a second filtrate B containing methanol, HMP and small amounts of the dibasic acid adducts.

Filtrate A is then cooled further to about 10° C. and the mixed precipitate is filtered off and found to contain substantial proportions of both terephthalic and isophthalic acid adducts. This precipitate is preferably subjected to further purification. That motor liquor is termed filtrate C.

Filtrate C is then agitated with excess water in order to decompose the adduct. The liberated acid is recovered by filtration and found to consist of isophthalic acid of about 97% purity. The HMP is recovered from the filtrate by heating to drive off water. This example shows the improved purity of isophthalic acid which may be obtained by a double fractional crystallization procedure combined with a selective methanol decomposition step.

In the above Examples X and XI, any of the previously described hexa-hydrocarbon substituted phosphoryl amides may be substituted for the hexamethyl phosphoryl amide to obtain analogous results.

The procedures described in Examples X and XI may be employed for separating any of the chemically similar groups of hydrogen donors disclosed above, as well as others which will be obvious to those skilled in the art. The invention should not however, be construed as limited to the specific separation techniques disclosed, since it is intended to embrace broadly the utilization of any of the chemical or physical properties of the herein described adducts for effecting a separation or purification of hydrogen-donor compounds, or of hydrogen donors and relatively non-hydrogen donors. These methods include broadly phase separations, selective adduct formation, selective adduct decomposition, fractional crystallization, fractional distillation, solvent extraction, extractive distillation, and other general methods known to he art.

The above description should not be considered as limiting since the invention embraces many variations which may be made by those skilled in the art without departing from the scope or spirit of the following claims.

I claim.

1. A method of resolving a crude mixture comprising terephthalic acid and isophthalic acid into the phosphoryl amide adducts of said acids, which comprises treating said mixtures with a hexa-lower alkyl substituted phosphoryl amide, thereby forming adducts of each of said acids with said phosphoryl amide, subjecting the resulting mixture of liquid-solid phase separation at a temperature below that at which solid terephthalic acid adduct begins to form, but above that at which solid isophthalic acid adduct will form, separating a solid phase which is essentially the phosphoryl amide adduct of terephthalic acid, the ratio of terephthalic acid to isophthalic acid in said solid phase being higher than the ratio in said crude mixture, the remaining liquid phase being substantially enriched in the isophthalic acid adduct.

2. A process according to claim 1 wherein approximately two moles of said phosphoryl amide per mole of said crude dibasic acids is employed, and said solid phase is formed by cooling the original homogenous liquid mixture of dibasic acids plus phosphoryl amide to crystallize the adduct of terephthalic acid, leaving as mother liquor a liquid adduct of isophthalic acid.

3. A process according to claim 1 wherein approximately two moles of said phosphoryl amide per mole of said crude dibasic acids is employed, and said solid phase is formed by cooling the original homogeneous liquid mixture of dibasic acids plus phosphoryl amide to crystallize the adduct of terephthalic acid, leaving a mother liquor of isophthalic acid adduct in excess phosphoryl amide solution.

4. A process according to claim 1 wherein said hexa-lower alkyl substituted phosphoryl amide is hexamethyl phosphoryl amide.

5. A method for effecting adduct-separation of a crude mixture comprising terephthalic acid and isophthalic acid which comprises extracting said mixture with an adduct-forming solvent which is essentially a hexa-lower alkyl phosphoryl amide, the temperature and solvent ratios employed in said extraction being insufficient to dissolve the terephthalic acid adduct, thereby forming phosphoryl amide adducts of each of said acids, and separating the undissolved terephthalic acid adduct of phosphoryl amide from the liquid extract containing the isophthalic acid adduct of phosphoryl amide.

6. A process as defined in claim 5 wherein said phosphoryl amide is essentially hexamethyl phosphoryl amide.

7. A method for effecting separation of a mixture comprising terephthalic acid and isophthalic acid which comprises treating said mixture with a hexa-lower alkyl substituted phosphoryl amide thereby forming adducts of each of said acids said phosphoryl amide, cooling and then filtering said adduct mixture to recover solid terephthalic acid adduct and an isophthalic acid adduct-enriched filtrate, treating said terephthalic acid adduct with methanol to displace terephthalic acid and dissolve isophthalic acid adduct and recovering substantially pure terephthalic acid from said methanol treated mixture.

8. A process according to claim 7 wherein isophthalic acid is recovered from said isophthalic acid adduct-enriched filtrate by water displacement.

9. A method for effecting separation of a mixture comprising terephthalic acid and isophthalic acid which comprises treating said mixture with a hexa-lower alkyl substituted phosphoryl amide thereby forming adducts of each of said acids with said phosphoryl amide, cooling and then filtering said adduct mixture to recover solid terephthalic acid adduct and an isophthalic acid adduct enriched filtrate, treating said terephthalic acid adduct with methanol to displace terephthalic acid and dissolve isophthalic acid adduct, recovering substantially pure terephthalic acid from said methanol treated mixture, further cooling said isophthalic acid adduct enriched filtrate to precipitate mixed isophthalic-terephthalic acid adducts, recycling said mixed adducts to said phosphoryl amide treating step, and recovering isophthalic acid from the mother liquor from said second cooling step.

10. A method for decomposing an adduct of terephthalic acid and a hexa-lower alkyl substituted phosphoryl amide which comprises treating said adduct with a lower aliphatic alcohol.

11. A method as defined in claim 10 wherein said lower aliphatic alcohol is methanol.

12. A method for decomposing an adduct of isophthalic acid and a hexa-lower alkyl substituted phosphoryl amide which comprises treating said adduct with water.

References Cited in the file of this patent

UNITED STATES PATENTS

| | | |
|---|---|---|
| 2,102,103 | Urbain et al. | Dec. 14, 1937 |
| 2,146,584 | Lipkin | Feb. 7, 1939 |
| 2,151,380 | Flint et al. | Mar. 21, 1939 |
| 2,160,841 | Dreyfus | June 6, 1939 |
| 2,587,464 | Ham | Feb. 26, 1952 |
| 2,596,344 | Newey et al. | May 13, 1952 |
| 2,603,660 | Heider | July 15, 1952 |
| 2,623,611 | Levine | Dec. 30, 1952 |
| 2,634,823 | Drake | Apr. 14, 1953 |

OTHER REFERENCES

Audrieth et al.: J. Am. Chem. Soc., vol. 64, pp. 1553–5 (1942).

Kosolapoff: Organo-Phosphorus Compounds, Wiley (1950), page 299.